United States Patent [19]

Goldner

[11] Patent Number: 4,542,892
[45] Date of Patent: Sep. 24, 1985

[54] POLY-PIPE FUSION MACHINE

[76] Inventor: Erwin P. Goldner, 2727 Felton St., San Diego, Calif. 92104

[21] Appl. No.: 583,436

[22] Filed: Feb. 24, 1984

[51] Int. Cl.⁴ .............................................. B25B 1/20
[52] U.S. Cl. .................................... 269/41; 269/127; 269/155; 269/254 CS; 269/208; 269/268
[58] Field of Search ................ 269/41, 127, 152, 155, 269/156, 208, 253, 254 CS, 268

[56] References Cited

U.S. PATENT DOCUMENTS 3,966,528  6/1976  Christie ............................... 269/41

Primary Examiner—Frederick R. Schmidt
Assistant Examiner—Judy J. Hartman
Attorney, Agent, or Firm—Charmasson & Holz

[57] ABSTRACT

A machine for use in the fusion fitting of a branch, T- or saddle junction to a pipe, comprises a first clamp for holding pipe and a second clamp for holding the fitting in the correct orientation to the pipe. A manually-operated sliding plunger arrangement allows the second clamp to be moved towards or away from the first clamp by way of a manually operated device. The second clamp can be locked against retraction from any one of a plurality of positions relative to the first clamp, and is adapted to be loaded towards the first clamp in its locked positions during the fusion process when a fitting engages a pipe or a heating tool is held between a pipe and fitting. The shaft which controls the movement of the second clamp has a pivoting extension or plunger terminated by a handle, which can be folded upward. Pins mounted at selected intervals on the plunger cooperate with a loading plate during the downward movement of the plunger to urge the second clamp either toward or away from the first clamp.

2 Claims, 14 Drawing Figures

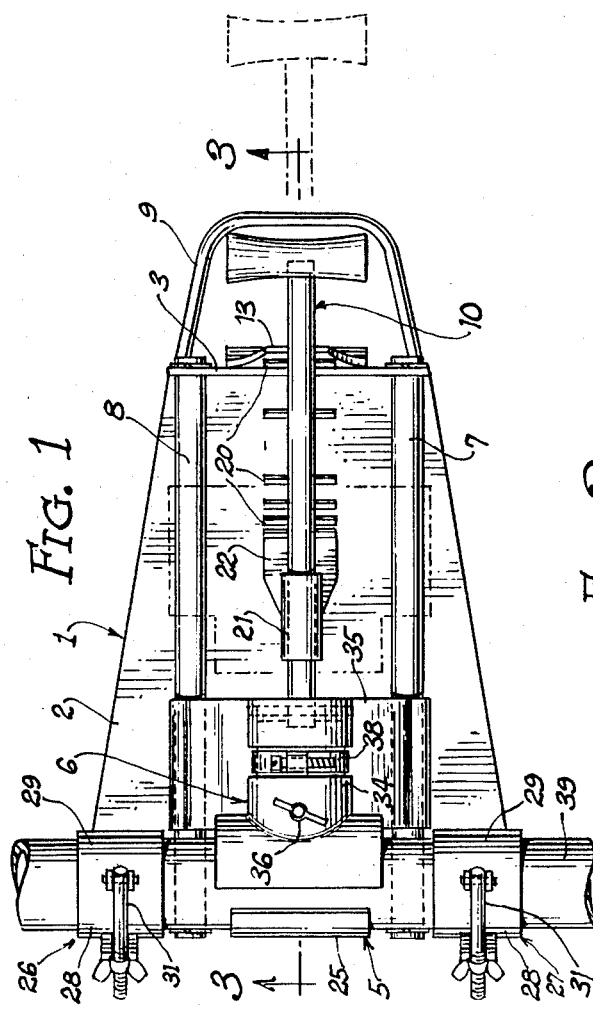
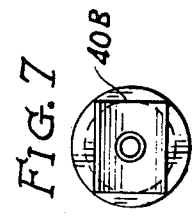
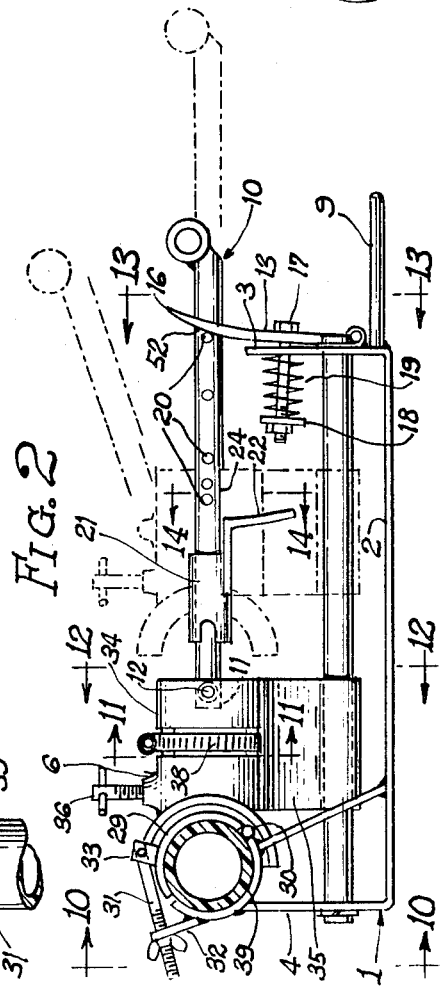

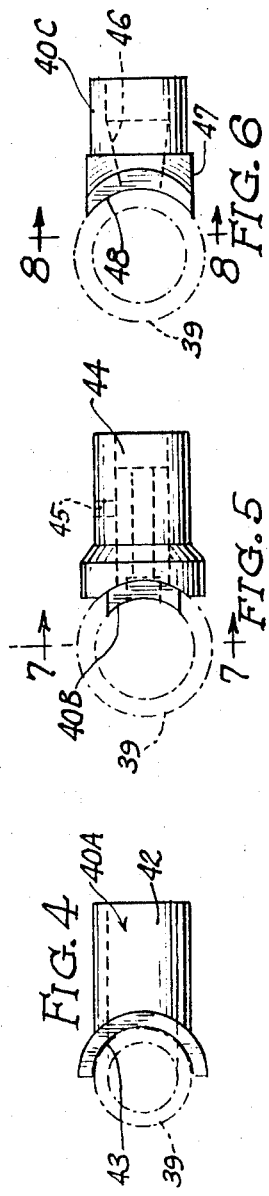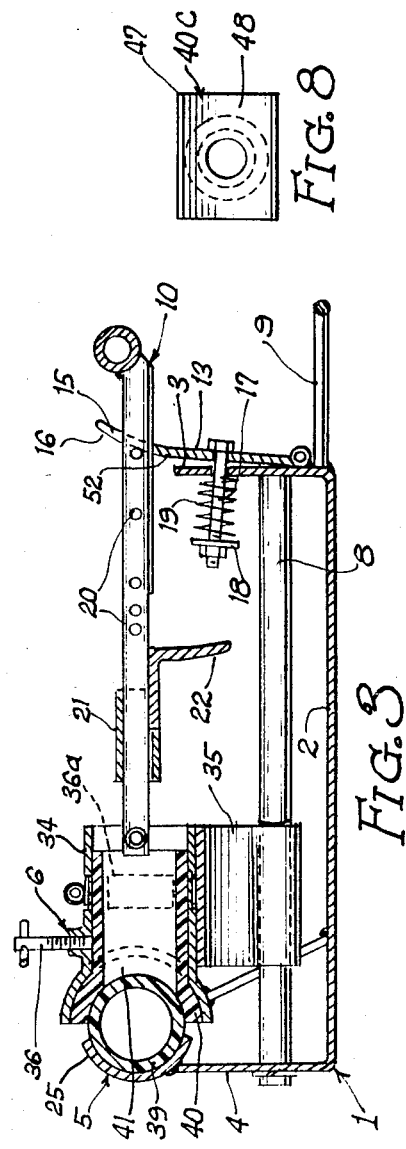

POLY-PIPE FUSION MACHINE

BACKGROUND OF THE INVENTION

The present invention relates to a machine for use in fusing a branch connector or T-junction fitting to a main pipe. It is particularly intended for joining such fittings to polyethylene gas pipes.

When a saddle-type or T-junction fitting is to be joined to the outside surface of a main's gas pipe, the two surfaces to be joined are first heated until they melt, and then forced together so that they form a joint as they cool. This procedure is normally carried out using a machine for holding the pipe and fitting in the correct orientation while their opposing faces are heated, and for subsequently urging the fitting against the opposing pipe surface with sufficient pressure to form the joint. A hydraulic mechanism is used for first urging the fitting against a heating tool to heat its face to be joined to the pipe, and then urging the heated face of the fitting against the pipe. However the pipe and fitting faces become very sticky when they melt, and the hydraulic mechanism sometimes joins when the fitting is being withdrawn from the heating tool.

Furthermore, this type of fitting operation is most often practiced on job sites, sometimes in a trench where under tight space limitations and extremely dusty or muddy conditions which preclude the use of bulky or complex mechanical devices, such as hydraulic machines mentioned above.

SUMMARY OF THE INVENTION

It is an object of the present invention to provide a machine for fusing a branch connection or T-junction to a main pipe which is less susceptible to joining than machines previously used for this purpose.

It is also an object of this invention to provide such a machine in a lightweight compact configuration with a minimum of moving parts and good reliability under severe environmental conditions.

According to the present invention, a machine for fusing a saddle-type or T-junction fitting to a pipe is provided, which comprises a first part for holding the pipe, a second part for holding the fitting in the correct orientation relative to the pipe, the second part being movable towards and away from the first part, a manually operable device for moving the second part between positions in which the fitting contacts the pipe and positions in which the fitting is spaced from the pipe and for selectively locking the second part against retraction from any selected position, and a loading device for urging the second part towards the first part in its locked position during a fusion process.

To operate the machine, the first part is connected to a pipe and the fitting to be joined to the pipe is connected to the second part with the manually operable device in a released position and the second part spaced from the pipe. The fitting is connected with its face to be fused facing towards the pipe. A heating tool which is specially adapted so as to simultaneously heat the opposing convex and concave faces of the pipe and fitting is then inserted between their opposing faces. The second part and fitting are then moved towards the first part using the manually operable device until the heating tool is gripped between the opposing faces of the pipe and fitting. The second part is then locked against retraction from this position. In this position the loading device urges the contacting faces of the fitting, heating tool, and pipe against each other.

When the pipe and fitting faces are sufficiently melted, the manually operable device is operated to release the second part and to retract it and the fitting away from the heating tool. The heating tool is then removed, and the second part is moved until the fitting contacts the pipe. The second part is then locked against retraction from this position, and the loading device urges the contacting faces of the fitting and pipe against each other until fusion occurs. The fitting is then released from the second part of the machine, and the second part is then released and retracted.

The second part of the machine is provided with adjustments for various sizes of saddle-type or T-junction fittings. It is preferably slidably mounted relative to the first part, and movable by means of a manually operated plunger. The plunger includes various stops corresponding to a plurality of predetermined positions of the second part, the plunger stops being adapted to engage in a spring loaded plate to hold the second part against retraction and urge it towards the first part.

Since the machine is completely manually operated, there is much less risk of joining than the previous machines of this type and it is easier to operate.

BRIEF DESCRIPTION OF THE DRAWINGS

FIG. 1 shows a top plan view of an embodiment of the pipe fusion machine according to the invention;

FIG. 2 is a side elevational view of the machine shown in FIG. 1;

FIG. 3 is a vertical cross-section taken along ine 3—3 of FIG. 1, showing a fitting in contact with a pipe;

FIG. 4 is a side view of a first type of saddle fitting in contact with a pipe;

FIG. 5 is a side view showing a second type of saddle fitting mounted in a holder and contacting a pipe;

FIG. 6 is a side view of a third type of saddle fitting in contact with a pipe;

FIG. 7 is a view of the second fitting taken along line 7—7 of FIG. 5;

FIG. 8 is a view of the third type of fitting taken along line 8—8 of FIG. 6;

DESCRIPTION OF THE PREFERRED EMBODIMENT

Figure 9:
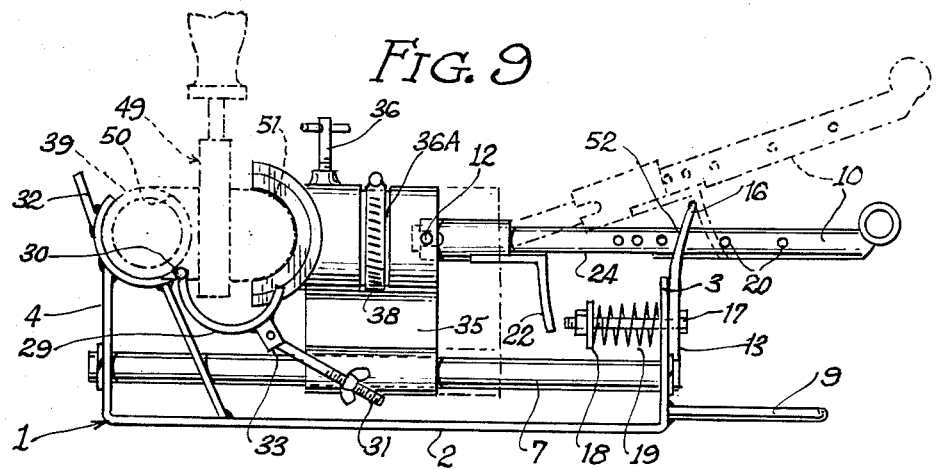
FIG. 9 is a side view of the machine of the machine of FIGS. 1 to 3 showing a heating tool in broken lines inserted between the pipe and fitting.
Figure 10:
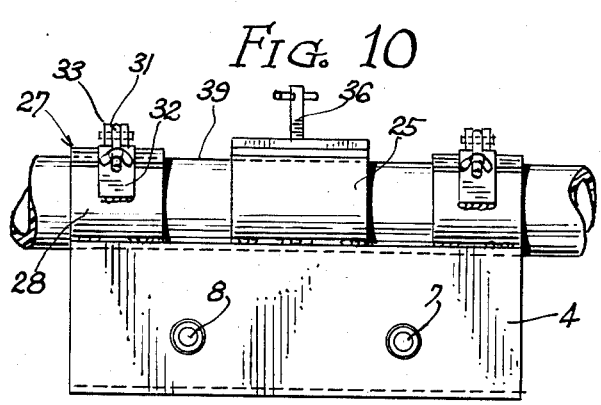
FIG. 10 is an end view of the machine taken along line 10—10 of FIG. 2.

FIGS. 1 to 3 and 9 to 14 of the drawings show a preferred embodiment of a pipe fusion machine for fusing a branch connector, T-junction, or saddle-type fitting to a pipe. The machine is normally used in the fusion of polyethylene gas pipes and fittings. FIGS. 4 to 7 show some of the types of saddle fittings which can be fused to gas pipes with the aid of the machine of this invention.

The machine basically comprises a frame 1 having a base plate 2 and end plates 3 and 4. A first part or clamp 5 for holding a pipe is mounted on end plate 4. A second part or clamp 6 for holding a T-junction or saddle fiting is slidably mounted on rails 7, 8 which extend between the end plates 3 and 4. The rails 7, 8 are mounted in the end plates with some free play to reduce the risk of jamming. A handle 9 for carrying the machine projects from end plate 3, as best seen in FIG. 1.

Figure 11:
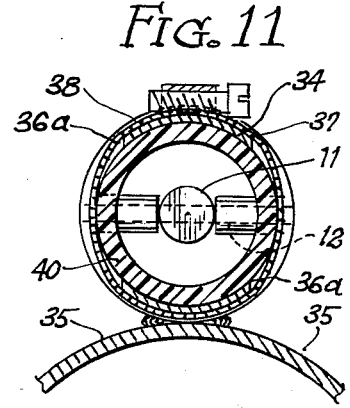
FIG. 11 is a cross-sectional view taken along line 11—11 of FIG. 2.
Figure 12:
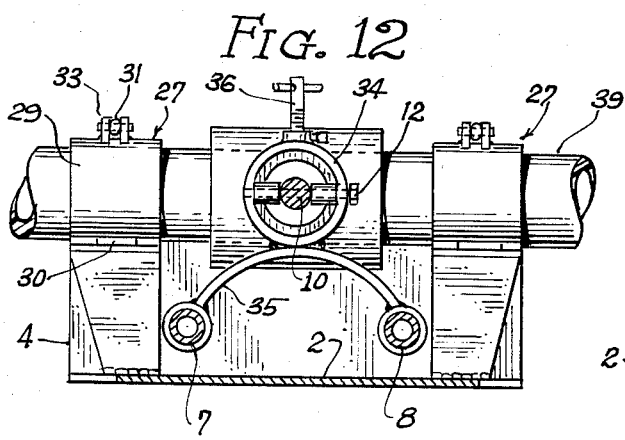
FIG. 12 is a cross-sectional view taken along line 12—12 of FIG. 2.

A manually operable plunger 10 is provided for moving the second clamp 6 along the rails 7, 8 towards or away from the first clamp 5. The inner end 11 of the plunger is pivotally mounted on a pivot pin 12 extending across the end of clamp 6, as shown in FIGS. 2, 11 and 12. Thus the free end of plunger 10 can be raised and lowered between the positions shown in FIG. 9.

Figure 13:
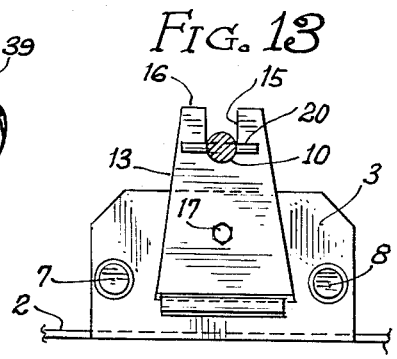
FIG. 13 is an end view taken along line 13—13 of FIG. 2.
Figure 14:
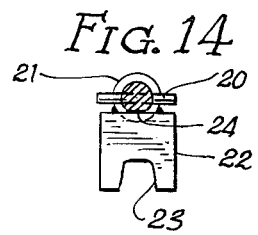
FIG. 14 is a cross-sectional view taken along line 14—14 of FIG. 2.

A loading plate 13 projects upwardly from end plate 3 and has an upwardly facing notch 15 in which the plunger 10 rests in its lowered position, as shown in FIG. 13. The plate 13 is connected non-rigidly at its lower end to the end plate 3, so that a certain amount of back and forth movement is possible at its upper end 16. Upper end 16 of the loading plate 13 is curved slightly outwardly from the machine (see FIGS. 2 and 3).

A pin 17 projects from loading plate 13 through the end plate 3 and has a head 18 at its inner end. A spring 19 acts between head 18 and the inner face of plate 3 so as to urge the upper end 16 of plate 13 inwardly relative to the machine.

The plunger 10 has a plurality of pin stops 20 at various predetermined positions along its length. These stops 20 are arranged to engage with the plate 13 so that a loading force can be applied to the plunger 10 via the spring 19, as will be described in more detail below. Instead of spaced stops 20, an adjustable position stop may be provided so that a loading force can be applied to the plunger in any position.

A sleeve member 21 is slidably mounted on plunger 10 between the innermost stop 20 and its inner end 11. Sleeve member 21 has a downwardly projecting support plate 22 (see FIGS. 9 and 14) by means of which the plunger 10 can be rested on the loading plate 13 in its upper, or released position. Support plate 22 has a notch 23 in its lower edge to prevent interference with pin 17 and spring 19 when the plunger is in its lowered position. A flattened face 24 on the lower surface of the plunger 19 (see FIGS. 12 and 14) prevents rotation of sleeve member 21 relative to the plunger 10.

The first clamp 5 comprises a curved locating plate 25 projecting upwardly from end plate 4, and circular clamp devices 26, 27 mounted on the end plate at opposite ends of locating plate 25. The clamp devices 26, 27 are of dimensions suitable for gripping standard pipes. Each clamp device comprises a fixed section 28 rigid with end plate 4 and a releasable section 29 hinged at one end 30 to the fixed section. The releasable section can be secured at its other end to the fixed section via an adjustable clamping screw 31 engaging between raised flanges 32, 33 on the fixed and releasable sections 28, 29, as best shown in FIG. 2. FIG. 9 shows the releasable section 29 of one of the clamp devices in its released position.

The sleeve clamp 6 comprises a sleeve member 34 having side flanges 35 projecting outwardly and downwardly which are slidably mounted on the rails 7 and 8, as best shown in FIG. 12. An adjustable clamping pin 36 projects transversely through sleeve member 34. The sleeve member 34 has opposed slits 36a at a reduced diameter portion 37 in its length, and a circular adjustable clamping sleeve 38 grips around the sleeve member 34 at this position (see FIGS. 1, 2 and 11).

When a fitting is to be connected to a pipe, the first clamp in initially connected to the pipe at the point at which the joint is to be made with the releasable sections 29 of each end clamp device released, the machine is placed so that the locating plate 25 and fixed clamp sections 28 rest against a pipe 39. The releasable sections 29 are then locked in place as shown in FIGS. 1 and 2.

A fitting 40 is then inserted into the front end 41 of sleeve member 34, and locked in place using clamping pin 36 and/or circular clamping sleeve 38. Clamping sleeve 38 is preferably used with large diameter fittings. Clamping pin 36 is used to secure smaller diameter fittings or reducers as will be explained below.

FIGS. 4 to 8 show some of the types of saddle fittings which may be locked in sleeve member 34. These saddle fittings are all commonly used in gas pipe junctions. The first type of saddle fitting 40A shown in FIG. 4 comprises a cylindrical part 42 and a concave end face 43 which fits around the pipe 39 as shown. This type of fitting is a close fit in member 34.

The second type of fitting 40B shown in FIGS. 5 and 7 is the same shape as that shown in FIG. 4 but has much smaller dimensions. It is therefore placed in an insert 44 adapted to fit in sleeve member 34. The insert 44 has a transverse bore 45 which is aligned with clamping pin 36 when the insert is fitted in the sleeve member 34. Thus the clamping pin 36 can be tightened to hold insert 44 and fitting 40B in place, clamping sleeve 38 may also be tightened to hold the insert 44 more rigidly.

The third type of saddle fitting 40C shown in FIGS. 6 and 8 has a tapered bore 46 and a square-edged head 47 having a concave surface 48 for mating with the pipe 39. The cylindrical portion of saddle fitting is a close fit in the sleeve member 34, and can be held in place using clamping pin 36.

Thus the type of fitting to be fused to the pipe 39 is first chosen and then clamped in the sleeve member 34 in the correct orientation to the pipe 34 i.e. with the concave face positioned to mate with the convex surface of the pipe. FIG. 3 shows a fitting of the type shown in FIG. 4 clamped in the sleeve member 34 and in mating engagement with the pipe 39.

When the pipe 39 and fitting 40 have been secured in their respective clamps, a heating tool 49 is inserted between the faces to be fused, as shown in FIG. 9. The heating tool 49 has a concave face 50 and a convex face 51 adapted to mate with the corresponding convex and concave faces of the pipe 39 and fitting 40, respectively. The fitting 40 is moved into contact with the tool face 51 using the plunger 10 so that the tool 49 is gripped between the pipe and fitting as shown in FIG. 9. The plunger 10 is then pushed down to engage in the notch 15 in loading plate 13. In this position one of the stops 20 will bear against the inside face 52 of plate 14. Because of the spring-loading of the plate 14, this results in the plunger 10 and sleeve member 34 being urged in a direction towards the pipe 39. Thus the respective mating faces of the pipe, tool and fitting are forced against each other. The positioning of the stops 20 is arranged to provide this spring-loading with all the standard size fittings and heating tools for forming T- or saddle-type pipe joints.

The surfaces of the pipe 39 and fitting 40 which are to be fused and now heated by the tool 49 until properly melted. Plunger 10 is then released by raising it to the dotted line position shown in FIG. 9, and then pulled to retract the sleeve member 34 and fitting 40 from the tool 49.

Tool 49 is then removed, and the sleeve member 34 and fitting 40 are pushed into a mating position with pipe 39 using the plunger 10, as shown in FIG. 2. When this position is reached, the plunger is pushed down to engage in the notch 15 in plate 13. As shown in FIG. 2, one of the stops 20 bears against the inside face of plate 14 in this position, and spring loading is applied to the plunger via the plate 13 and stop 20. Thus the mating faces of the pipe 39 and fitting 40 are forced against each other.

Thus a plurality of stops 20 must be provided on the plunger 10, and the positioning of these stops is critical. The stop positions must be such that the necessary spring loading is provided when any of the required standard-size T- or saddle pipe fittings are in mating engagement with the pipe 39, as shown in FIG. 2, and when standard-size heating tools are inserted between the pipe and chosen fitting, as shown in FIG. 9. Alternatively, a movable stop may be provided to be positioned against the plate 13 in any chosen position. The mating faces of the pipe and fitting are then allowed to cool until fusion occurs. The fitting is then released from sleeve member 34, and the plunger 10 is raised and pulled to retract the sleeve member 34 from the fused pipe and fitting. The pipe clamp is then released. A separate punching tool can then be used to punch an opening from the fitting into the pipe.

The pipe fusion machine of this invention is manually operated and thus less susceptible to jamming than the previously used hydraulically operated machines. The second clamp is mounted on slide rails and thus fixed in the correct orientation.

The machine is simple to operate and can be easily carried about from work site to work site. It is particularly intended for use in forming pipe joints of the T- or saddle-type in polyethylene gas pipes.

While the invention has been particularly shown and described with reference to the preferred embodiment, it will be understood that modifications can be made to the disclosed embodiment without departing from the scope of the invention, which is defined in the appended claims.

What is claimed is:

1. A machine for fusing a saddle-type, branch or T-junction fitting to a pipe, comprising:
    a first clamp for holding said pipe;
    a second clamp for holding said fitting;
    means for maintaining said second clamp oriented so that said fitting is axially orthogonal to the axis of said pipe and so that a bonding surface of said fitting is parallel to a surface to be mated on said pipe;
    a manually-operable plunger for moving said second clamp between a first position where said fitting is mated with said pipe and a second position where said fitting is separated from said pipe;
    said first position being selectable from a plurality of predetermined positions in order to accomodate a plurality of pipe or fitting sizes;
    said plunger being pivotally mounted to said second clamp at one end so as to arcuately move between a locked first position where a loading force is applied and a released position where said loading force is not applied;
    said plunger further having a plurality of pin stops spaced along its length at positions corresponding to said predetermined positions;
    a resiliently-loaded plate having a notch, the sides of which engage one of said plurality of pin stops when said plunger is moved to said locked first position;
    said loaded plate being arranged to bear against a respective one of said pin stops in each of said predetermined positions;
    said plate applying a force on said second clamp in a direction orthogonal to the pipe to the axis of said pipe during a fusion operation.

2. The machine of claim 1, wherein the loading for said plate is provided by a spring.

* * * * *